(12) United States Patent
Durand et al.

(10) Patent No.: US 8,371,119 B2
(45) Date of Patent: Feb. 12, 2013

(54) DRAIN VALVE FOR AN AIR INTAKE SYSTEM OF A MACHINE

(75) Inventors: James Carl Durand, Dunlap, IL (US); Joseph E. Tabor, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 336 days.

(21) Appl. No.: 12/877,533

(22) Filed: Sep. 8, 2010

(65) Prior Publication Data
US 2012/0055151 A1   Mar. 8, 2012

(51) Int. Cl.
*F02B 29/04* (2006.01)
*F02B 33/00* (2006.01)
*F02M 35/10* (2006.01)
*G05D 7/00* (2006.01)
*G05D 9/00* (2006.01)

(52) U.S. Cl. ...................... 60/599; 123/563; 137/118.01
(58) Field of Classification Search .................... 60/599; 123/563; 137/118.01
See application file for complete search history.

(56) References Cited

U.S. PATENT DOCUMENTS

| 3,162,182 | A * | 12/1964 | Gratzmuller | 123/41.08 |
| 5,054,457 | A | 10/1991 | Sakamoto | |
| 6,301,887 | B1 | 10/2001 | Gorel et al. | 123/563 |
| 2003/0024567 | A1 * | 2/2003 | Spriegel et al. | 137/62 |
| 2008/0302327 | A1 | 12/2008 | Dahl et al. | |
| 2009/0014161 | A1 | 1/2009 | Mihajlovic | |
| 2009/0223493 | A1 | 9/2009 | Rutherford | 123/563 |
| 2010/0077995 | A1 | 4/2010 | Buia et al. | |

FOREIGN PATENT DOCUMENTS

| DE | 102004032777 A1 | * | 7/2005 |
| EP | 1391677 | | 2/2004 |
| JP | 57151019 A | * | 9/1982 |
| JP | 08100661 A | * | 4/1996 |
| JP | 08257326 A | * | 10/1996 |
| JP | 11350962 A | * | 12/1999 |
| JP | 2000130172 A | * | 5/2000 |
| JP | 2001182542 | | 7/2001 |
| JP | 2004176691 A | * | 6/2004 |
| JP | 2005226476 A | * | 8/2005 |
| JP | 4216978 | | 1/2009 |
| JP | 2011241797 A | * | 12/2011 |

* cited by examiner

*Primary Examiner* — Thai Ba Trieu
(74) *Attorney, Agent, or Firm* — Liell & McNeil

(57) ABSTRACT

A machine includes an internal combustion engine mounted on a chassis and having an intake manifold. An air intake system extends from an air inlet to the intake manifold and includes a condensate collection location. The machine also includes a liquid system having a pump that is mechanically coupled to the internal combustion engine. A drain valve is positioned in the air intake system at the condensate collection location and includes a valve member having a closed position and an open position. In the closed position of the valve member, a closing surface of the valve member is exposed to pressurized liquid within the liquid system and the condensate collection location is fluidly blocked from a discharge opening in the air intake system. In the open position of the valve member, the condensate collection location is fluidly connected to the discharge opening.

12 Claims, 3 Drawing Sheets

DRAIN VALVE FOR AN AIR INTAKE SYSTEM OF A MACHINE

TECHNICAL FIELD

The present disclosure relates generally to a drain valve for an air intake system for an engine of a machine, and more particularly to an automatic drain valve for removing condensate from the air intake system.

BACKGROUND

Utilizing turbochargers is commonplace for increasing the density of air entering an engine of a machine to create more power. Increasing the density of the intake air may also increase the temperature of the air. As a result, charge air coolers are commonly provided, particularly in diesel engines, for removing the excess heat from the intake air and, thus, reducing premature compression ignition. Excess cooling of the charged air may provide opportunities for condensation to occur in the air intake system. In cold climates the moisture may first condense and then freeze, forming ice within the air intake system. This ice may accumulate until the machine is brought into a warmer climate, such as during machine maintenance, at which point the ice will thaw and collect within the air intake system.

As should be appreciated, significant amounts of condensate may collect at low points throughout the air intake system. Depending on the particular configuration of the air intake system, the volume of the condensate may be high enough, when introduced into an engine combustion chamber, to prohibit a compression event and cause damage to the engine if the crankshaft rotates without relieving the pressure within the combustion chamber.

Possible solutions to reduce the amount of condensate collected within the air intake system include the use of manual valves, which would require manual actuation during maintenance of the machine. Automatic drains may prove more reliable, however, many automatic drain designs have cost and reliability considerations. For example, passive mechanical valves are susceptible to contamination issues since certain operating conditions create a negative pressure within the air intake system, which may draw in unfiltered air. Japanese Patent No. 4216978 discloses an automatic drain positioned within an intercooler and opened in response to air supply pressure of an air supply system.

The present disclosure is directed to one or more of the problems set forth above.

SUMMARY OF THE DISCLOSURE

In one aspect, a machine includes an internal combustion engine mounted on a chassis and having an intake manifold. An air intake system extends from an air inlet to the intake manifold and includes a condensate collection location. The machine also includes a liquid system having a pump that is mechanically coupled to the internal combustion engine. A drain valve is positioned in the air intake system at the condensate collection location and includes a valve member having a closed position and an open position. In the closed position of the valve member, a closing surface of the valve member is exposed to pressurized liquid within the liquid system and the condensate collection location is fluidly blocked from a discharge opening in the air intake system. In the open position of the valve member, the condensate collection location is fluidly connected to the discharge opening.

In another aspect, a method of operating a machine includes running the internal combustion engine. While the internal combustion engine is running, a liquid within a liquid system is pressurized, a closing surface of a valve member is exposed to the pressurized liquid, the valve member is moved to a closed position, and condensate is collected at a condensate collection location. The method also includes stopping the internal combustion engine. When the internal combustion engine is stopped, the liquid is brought to atmospheric pressure, the valve member is moved to an open position, and the condensate is drained from the condensate collection location through a discharge opening in the air intake system.

In yet another aspect, a drain valve for an air intake system of a machine includes a valve body and a valve member positioned within the valve body. The valve member has a closed position wherein a closing surface of the valve member is exposed to pressurized liquid within a liquid system of the machine and a condensate collection location of the air intake system is fluidly blocked from a discharge opening in the air intake system. The valve member also has an open position wherein the condensate collection location is fluidly connected to the discharge opening. A spring is operably positioned within the valve body to bias the valve member toward the open position.

DETAILED DESCRIPTION

Figure 1:
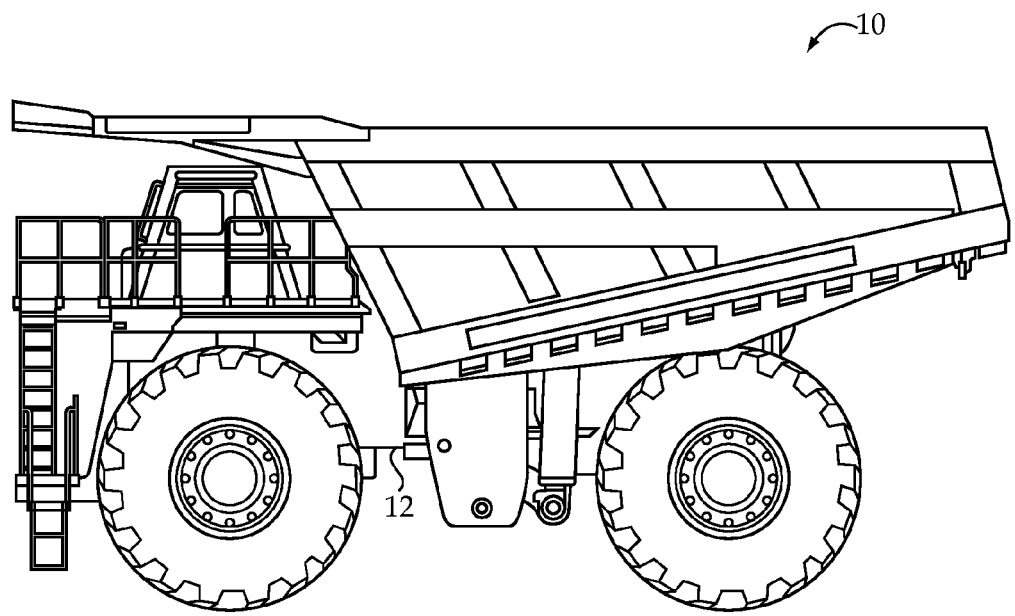
FIG. 1 is a side diagrammatic view of a machine having an air intake system, according to the present disclosure.

An exemplary embodiment of a machine 10 is shown generally in FIG. 1. The machine 10 may be a mining truck, as shown, or any other off-highway or on-highway vehicle, or even ship, having a chassis 12. Generally, machine 10 will include an internal combustion engine, or engine system, mounted on the chassis 12, an air intake system, and a liquid system, all of which will be discussed in greater detail with reference to FIG. 2.

Figure 2:
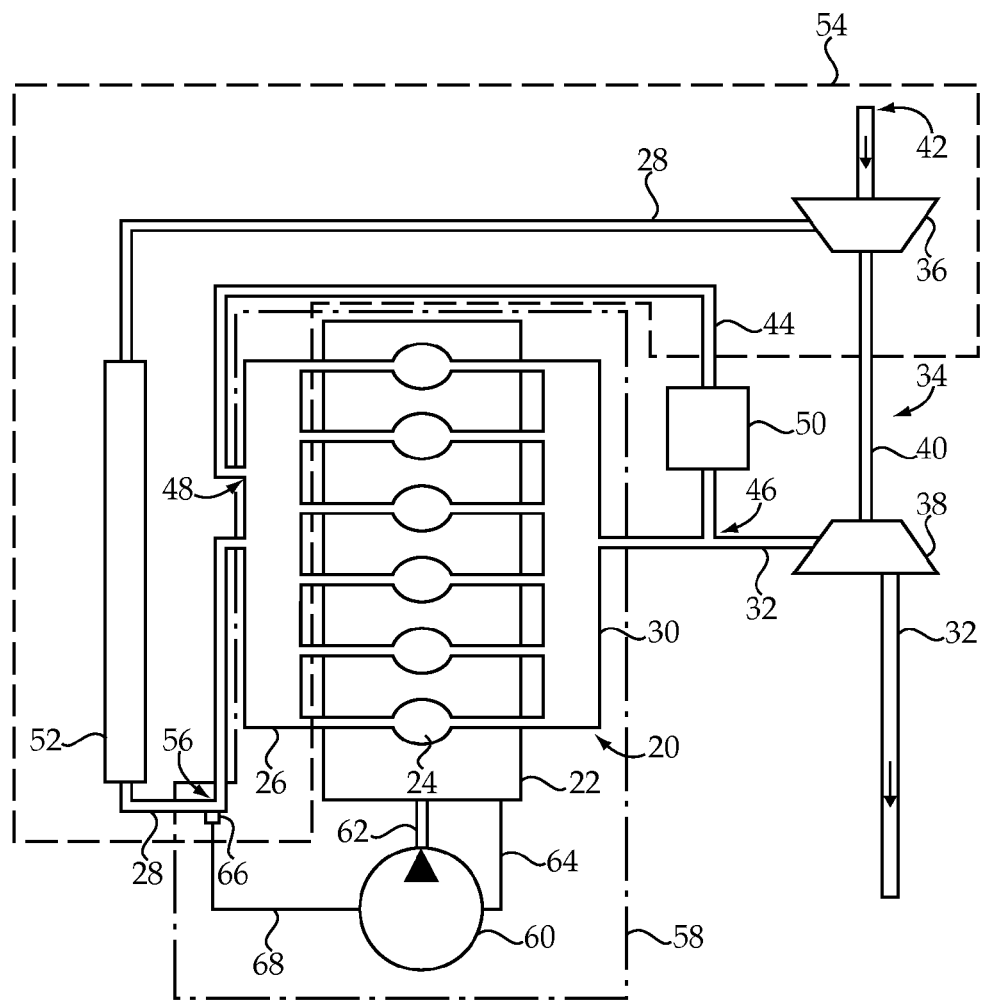
FIG. 2 is a schematic view of an engine system of the machine of FIG. 1, including an air intake system.

Referring to FIG. 2, there is shown a schematic view of an internal combustion engine 20, such as a four-stroke, compression ignition engine, including an engine block 22 defining a plurality of combustion chambers or cylinders 24. In the exemplary internal combustion engine 20, six combustion chambers 24 are shown; however, those skilled in the art will appreciate that any number of combustion chambers may be applicable. The internal combustion engine 20 includes an intake manifold 26 in communication with the combustion chambers 24 and capable of providing air to the internal combustion engine 20 via an air intake conduit 28. An exhaust manifold 30 is also in communication with the combustion chambers 24 and is capable of expending exhaust gas from the engine block 22 via an exhaust conduit 32.

The internal combustion engine 20 may also include a turbocharger of standard design, shown generally at 34. Although one turbocharger 34 is shown in the illustrated embodiment, it is known that more than one turbocharger 34 in series or parallel may be used with internal combustion engine 20. The turbocharger 34 includes a compressor 36 connected to a turbine 38 via a shaft 40. Exhaust gas leaving the exhaust manifold 30 passes through the exhaust conduit 32 and to a wheel of the turbine 38 to make it rotate. The rotation of the wheel turns the shaft 40, which, in turn, rotates a wheel of the compressor 36. The rotation of the compressor wheel pulls in ambient air at an air inlet 42 and compresses it.

A recirculation conduit 44 may provide a path for a portion of the exhaust expended through the exhaust conduit 32 to be rerouted to the intake manifold 26. Specifically, an inlet 46 of the recirculation conduit 44 connects to the exhaust conduit 32, while an outlet 48 of the recirculation conduit 44 connects to the intake manifold 26. An exhaust gas cooler 50 may be provided along the recirculation conduit 44 for reducing the temperature of exhaust gases from the internal combustion engine 20 prior to reintroduction into the intake manifold 26. Further, one or more particulate filters, which may or may not include a catalyst coating, may be provided along the exhaust conduit 32, upstream and/or downstream of the recirculation conduit 44, to trap particulate matter from the exhaust gas traveling through the conduit 32. Regenerating means may also be provided to periodically or continuously oxidize trapped particulate matter in the particulate filter.

Although a specific high pressure exhaust gas recirculation strategy is provided, it should be appreciated that it is provided for exemplary purposes only. The internal combustion engine 20 may include any of a variety of known high pressure exhaust gas recirculation strategies or, alternatively, may incorporate a low pressure exhaust gas recirculation strategy. In a low pressure exhaust gas recirculation strategy, for example, a portion of the exhaust expended through the exhaust conduit 32 may be rerouted to the air inlet 42, upstream of the compressor 36. Yet alternatively, the internal combustion engine 20 may incorporate no exhaust gas recirculation strategies at all.

Since the compressed air may be very hot, the intake conduit 28 may pass the air through a charge air cooler 52 for cooling prior to introduction into the intake manifold 26. The charge air cooler 52 may be any of a variety of heat exchangers that use ambient air or sea water (ship) to cool the compressed air as it flows through the charge air cooler 52. For example, the charge air cooler 52 may include an air-to-air aftercooler of standard design.

The components described above may generally comprise an air intake system 54 of the machine 10. Specifically, the air intake system 54 may extend from the air inlet 42 to the intake manifold 26 and may include any number of components, including, but not limited to, one or more of the components described above. The air intake system 54 also includes a condensate collection location 56. The condensate collection location 56 may occur at a low point within the air intake system 54, and may represent a location within the air intake system 54 where condensate naturally collects under the force of gravity. According to the exemplary embodiment, the condensate collection location 56 may be positioned within the air intake conduit 28. However, it should be appreciated that condensation may occur throughout the air intake system 54 and, as such, one or more condensate collection locations 56 may be present within any conduits or components of the air intake system 54, including, for example, the charge air cooler 52.

Machine 10 also includes one or more liquid systems, such as a liquid system 58. As shown, liquid system 58 includes a pump 60 that is mechanically coupled to the internal combustion engine 20 via a shaft 62. According to the exemplary embodiment, the pump 60 may include an oil pump for pressurizing a lubricant within the liquid system 58. For example, a lubricant may be circulated through the internal combustion engine 20 via one or more fluid lines 64 to lubricate certain components of the internal combustion engine 20, such as, for example, pistons and bearings.

It should be appreciated that the machine 10 may include additional and/or alternative liquid systems for operating hydraulic systems, engine systems, transmission systems, and the like. For example, the machine 10 may include a hydraulic system, including one or more of a hydraulic pump, motor, or cylinder for distributing hydraulic fluid that is controlled by one or more valves and distributed through one or more hoses or tubes, for operating a hydraulic implement of the machine 10. In addition, the machine 10 may include a liquid cooling system for the internal combustion engine 20 that may include, for example, an engine water jacket, water pump, radiator, fan, thermostat, or the like for cooling the internal combustion engine 20. Further, the machine 10 may include a transmission system including, for example, a pump for pumping transmission fluid through gears and other components of a transmission, driveshaft, and final drive. Any of these liquid systems, or other liquid systems of machine 10, may be utilized as the liquid system 58 referenced herein.

The pump 60 may also be fluidly connected to a drain valve 66 via one or more fluid lines 68. Although the drain valve 66 may be positioned anywhere throughout the air intake system 54, the drain valve 66 is preferably positioned at the condensate collection location 56. The drain valve 66, discussed later in greater detail, is exposed to pressurized liquid within the liquid system 58. It should be appreciated by those skilled in the art that the liquid system 58 is at atmospheric pressure when the internal combustion engine 20 is stopped, and is pressurized relative to atmospheric pressure when the internal combustion engine 20 is running.

Figure 3:
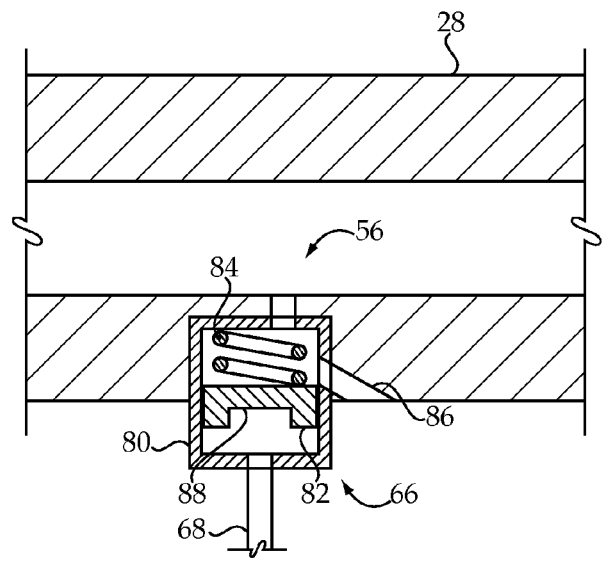
FIG. 3 is a sectioned view of a drain valve for use with the air intake system of FIG. 2, shown in a first configuration according to one aspect of the present disclosure.

Turning now to FIG. 3, the drain valve 66 is shown in greater detail. The drain valve 66 may generally include a valve body 80 having a valve member 82 positioned therein. A spring 84 may be operably positioned to bias the valve member 82 toward an open position, as shown in FIG. 3. Specifically, in the open position, the condensate collection location 56 is fluidly connected to a discharge opening 86 in the air intake system 54. As such, condensate may be drained from the condensate collection location 56 through the discharge opening 86.

The valve member 82 includes a closing surface 88 that is exposed to pressurized liquid within the liquid system 58 of FIG. 2 via the one or more fluid lines 68. When the internal combustion engine 20 is running and the liquid system 58 is pressurized, the drain valve 66 is configured such that the pressurized liquid within the fluid lines 68 may exert a force against valve member 82 that is strong enough to overcome the bias of spring 84 and move the valve member 82 into a closed position, shown in FIG. 4. When the valve member 82 is in a closed position, the condensate collection location 56 is fluidly blocked from the discharge opening 86. In the closed position of the valve member 82, condensate may collect at the condensate collection location 56.

INDUSTRIAL APPLICABILITY

The present disclosure may find potential application to air intake systems of machines. Further, the present disclosure may be particularly applicable to air intake systems having a condensate collection location. Yet further, the present disclosure may be applicable to air intake systems including components that may increase the amount of condensate collected at the condensate collection location. The present disclosure may be especially applicable to machines operating in cold climates, where condensate may freeze and form ice within the air intake systems. The ice may accumulate until the machine is brought into a warmer climate, at which point the ice may thaw and collect at the condensate collection location.

Referring generally to FIGS. 1-4, an exemplary machine 10 includes an internal combustion engine 20 mounted on a chassis 12 and having an intake manifold 26. An air intake system 54 extends from an air inlet 42 to the intake manifold 26 and includes a condensate collection location 56. The machine 10 also includes a liquid system 58 having a pump 60 that is mechanically coupled to the internal combustion engine 20. A drain valve 66 is positioned in the air intake system 54 at the condensate collection location 56 and includes a valve member 82 having a closed position and an open position.

During operation of the machine 10, condensation may occur within components of the air intake system 54 and may collect at low points within the system 54. For example, when charged air, which may or may not include recirculated exhaust gas, is passed through a charge air cooler 52, the reduction in temperature associated with the cooling of the charged air may, under certain conditions, reduce the temperature of the fluid below the dew point, which causes the liquid from the fluid stream to condense. If surface temperatures are below freezing, this condensate may freeze, and then later thaw. The condensate may collect at low points within the air intake system 54 and may cause damage to the internal combustion engine 20 if it is not removed.

Figure 4:
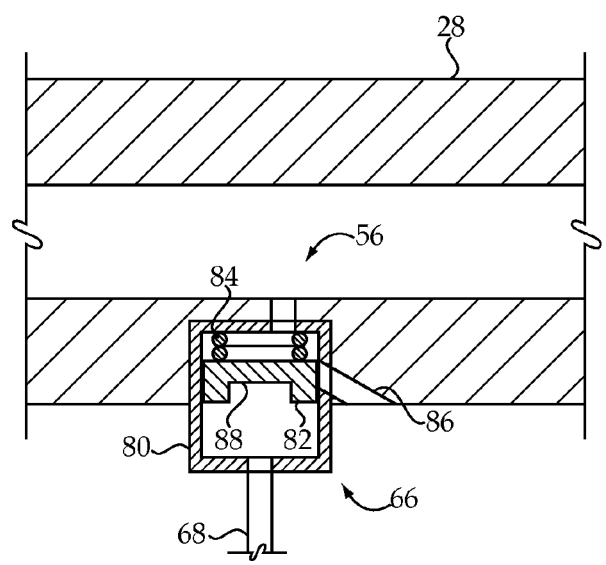
FIG. 4 is a sectioned view of the drain valve of FIG. 3, shown in a second configuration according to one aspect of the present disclosure.

Condensate may be removed from the condensate collection location 56 of the exemplary machine 10 in the following manner. First, typical operation of the machine 10 may begin by running the internal combustion engine 20. While the internal combustion engine 20 is running, a liquid, such as a lubricant, with the liquid system 58 may become pressurized. When the pressurized liquid within one or more fluid lines 68 exerts a force on a closing surface 88 of the valve member 82 that is stronger than a mechanically biased position of the valve member 82, the valve member 82 may be moved into a closed position, as shown in FIG. 4. When the valve member 82 is in the closed position, condensate may collect at the condensate collection location 56.

When the internal combustion engine 20 is stopped, the liquid system 58 may be returned to atmospheric pressure. The liquid within liquid system 58, which is no longer pressurized, may return to a sump via the one or more fluid lines 68, or may remain in the fluid lines 68 at atmospheric pressure. The drain valve 66, when the closing surface 88 of valve member 82 is not exposed to pressurized liquid, is mechanically biased such that valve member 82 will move to an open position, shown in FIG. 3. When the valve member 82 is in the open position, the condensate collection location 56 is fluidly connected to a discharge opening 86 of the air intake system 54 to allow condensate from the condensate collection location 56 to drain from the air intake system 54 through the discharge opening 86.

As should be appreciated, the incorporation and use of drain valve 66 within the air intake system 54, as disclosed herein, provides an effective way to remove condensate from the air intake system 54 at a condensate collection location 56 in a reliable and low cost manner. Specifically, the present disclosure discloses the use of a drain valve 66 that is simple in construction, utilizes an actuation means that is readily available within the machine 10, and is effective in removing condensate from the air intake system 54 automatically when the internal combustion engine 20 is stopped, without an increased risk that unfiltered air will enter the air intake system 54. Further, the drain valve 66 has a benefit over other drains positioned within the charge air cooler 52 since drain valve 66 is strategically positioned at one or more condensate collection locations 56 within the air intake system 54.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method of operating a machine, the machine including an internal combustion engine mounted on a chassis and having an intake manifold, an air intake system extending from an air inlet to the intake manifold and including a condensate collection location, a liquid system including a pump that is mechanically coupled to the internal combustion engine, and a drain valve positioned in the air intake system at the condensate collection location and including a valve member, the method comprising the steps of:
   running the internal combustion engine, wherein the running step includes: pressurizing a liquid within the liquid system; exposing a closing surface of the valve member to the pressurized liquid; moving the valve member to a closed position; and collecting condensate at the condensate collection location; and
   stopping the internal combustion engine, wherein the stopping step includes: bringing the liquid to atmospheric pressure; moving the valve member to an open position; and draining condensate from the condensate collection location through a discharge opening in the air intake system.

2. The method of claim 1, wherein the step of moving the valve member to the closed position includes fluidly blocking the condensate collection location from the discharge opening.

3. The method of claim 1, wherein the step of moving the valve member to the open position includes fluidly connecting the condensate collection location to the discharge opening.

4. The method of claim 1, further including mechanically biasing the valve member toward the open position.

5. A drain valve for an air intake system of a machine, the machine including an internal combustion engine mounted on a chassis and having an intake manifold, and a liquid system including a pump that is mechanically coupled to the internal combustion engine, the air intake system extending from an air inlet to the intake manifold and including a condensate collection location, the drain valve including:
   a valve body;
   a valve member positioned within the valve body, the valve member having a closed position wherein a closing surface of the valve member is exposed to pressurized liquid within the liquid system and the condensate collection location is fluidly blocked from a discharge opening in the air intake system, and an open position wherein the condensate collection location is fluidly connected to the discharge opening; and
   a spring operably positioned within the valve body to bias the valve member toward the open position.

6. A machine, comprising:
   a chassis;
   an internal combustion engine mounted on the chassis and having an intake manifold;
   an air intake system extending from an air inlet to the intake manifold, the air intake system including a condensate collection location;

a liquid system including a pump that is mechanically coupled to the internal combustion engine; and a drain valve positioned in the air intake system at the condensate collection location and including a valve member having a closed position wherein a closing surface of the valve member is exposed to pressurized liquid within the liquid system and the condensate collection location is fluidly blocked from a discharge opening in the air intake system, and an open position wherein the condensate collection location is fluidly connected to the discharge opening.

7. The machine of claim 6, wherein the air intake system further includes an air intake conduit extending from a compressor of a turbocharger to the intake manifold, wherein a charge air cooler is disposed along the air intake conduit.

8. The machine of claim 7, wherein the charge air cooler is one of an air-to-air aftercooler and an air-to-liquid aftercooler.

9. The machine of claim 7, further including an exhaust conduit extending from an exhaust manifold of the internal combustion engine to a turbine of the turbocharger, and a recirculation conduit, wherein an inlet of the recirculation conduit connects to the exhaust conduit and an outlet of the recirculation conduit connects to the intake manifold.

10. The machine of claim 6, wherein the liquid system is at atmospheric pressure when the internal combustion engine is stopped and is pressurized relative to atmospheric pressure when the internal combustion engine is running.

11. The machine of claim 10, wherein the pump is an oil pump for pressurizing a lubricant within the liquid system relative to atmospheric pressure.

12. The machine of claim 6, wherein the drain valve further includes a spring operably positioned to bias the valve member toward the open position.

* * * * *